(12) United States Patent
Okuno et al.

(10) Patent No.: US 6,290,470 B1
(45) Date of Patent: Sep. 18, 2001

(54) SHAFT SEALING ASSEMBLY AND COMPRESSOR INCORPORATING THE SAME

(75) Inventors: Takuya Okuno; Masahiro Kawaguchi; Masanori Sonobe; Atsuyuki Morishita, all of Kariya; Keiichi Chiba, Tokyo, all of (JP)

(73) Assignees: Kabushiki Kaisha Toyoda Jidoshokki Seisakusho, Kariya; Eagle Industry Co., Ltd., Tokyo, both of (JP)

( * ) Notice: Subject to any disclaimer, the term of this patent is extended or adjusted under 35 U.S.C. 154(b) by 0 days.

(21) Appl. No.: 09/410,285

(22) Filed: Sep. 30, 1999

(30) Foreign Application Priority Data

Oct. 2, 1998 (JP) ................................................. 10-281582

(51) Int. Cl.⁷ ................................ F04B 1/12; F04B 1/26; F01B 3/00
(52) U.S. Cl. .......................... 417/269; 417/222.1; 92/71; 277/565
(58) Field of Search ................................. 417/269, 222.1; 92/71; 277/565, 551, 562, 570, 573

(56) References Cited

U.S. PATENT DOCUMENTS

| | | | |
|---|---|---|---|
| 4,042,248 | * 8/1977 | Williamitis | 277/138 |
| 4,822,059 | * 4/1989 | Shimasaki et al. | 277/152 |
| 5,056,799 | 10/1991 | Takenaka et al. | 277/47 |
| 5,083,802 | * 1/1992 | Shimasaki et al. | 277/152 |
| 5,183,271 | 2/1993 | Wada et al. | 277/152 |
| 5,326,111 | * 7/1994 | Hatch | 277/37 |
| 5,503,408 | * 4/1996 | Hemann et al. | 277/152 |
| 5,607,168 | 3/1997 | Dahll | 277/152 |
| 5,616,008 | * 4/1997 | Yokono et al. | 417/222.2 |

FOREIGN PATENT DOCUMENTS

| | | | |
|---|---|---|---|
| 0 851 159 A1 | 7/1998 | (EP) | F16J/15/32 |
| 2-47311 | * 12/1990 | (JP) . | |
| 07139633 | 5/1995 | (JP) | F16J/15/32 |

* cited by examiner

Primary Examiner—Timothy S. Thorpe
Assistant Examiner—Michael K. Gray
(74) Attorney, Agent, or Firm—Morgan & Finnegan, LLP

(57) ABSTRACT

A shaft sealing assembly for a compressor includes first and second lip rings, each of which is disposed around a shaft of a compressor to provide sealing. A retainer ring is disposed between the two lip rings to retain the shape of the first lip ring, which serves to allow leakage of fluid when the shaft rotates and prevent the leakage when the shaft is stopped. The three rings are held together at the radial portions of the rings. Each of the radial portions of the two lip rings extends outwardly beyond the radial portion of the retainer ring, providing an annular contact area. The two lip rings resiliently contact one another in the contact area. An annular projection is provided on at least one of the lip rings in the contact area to ensure the sealing.

15 Claims, 4 Drawing Sheets

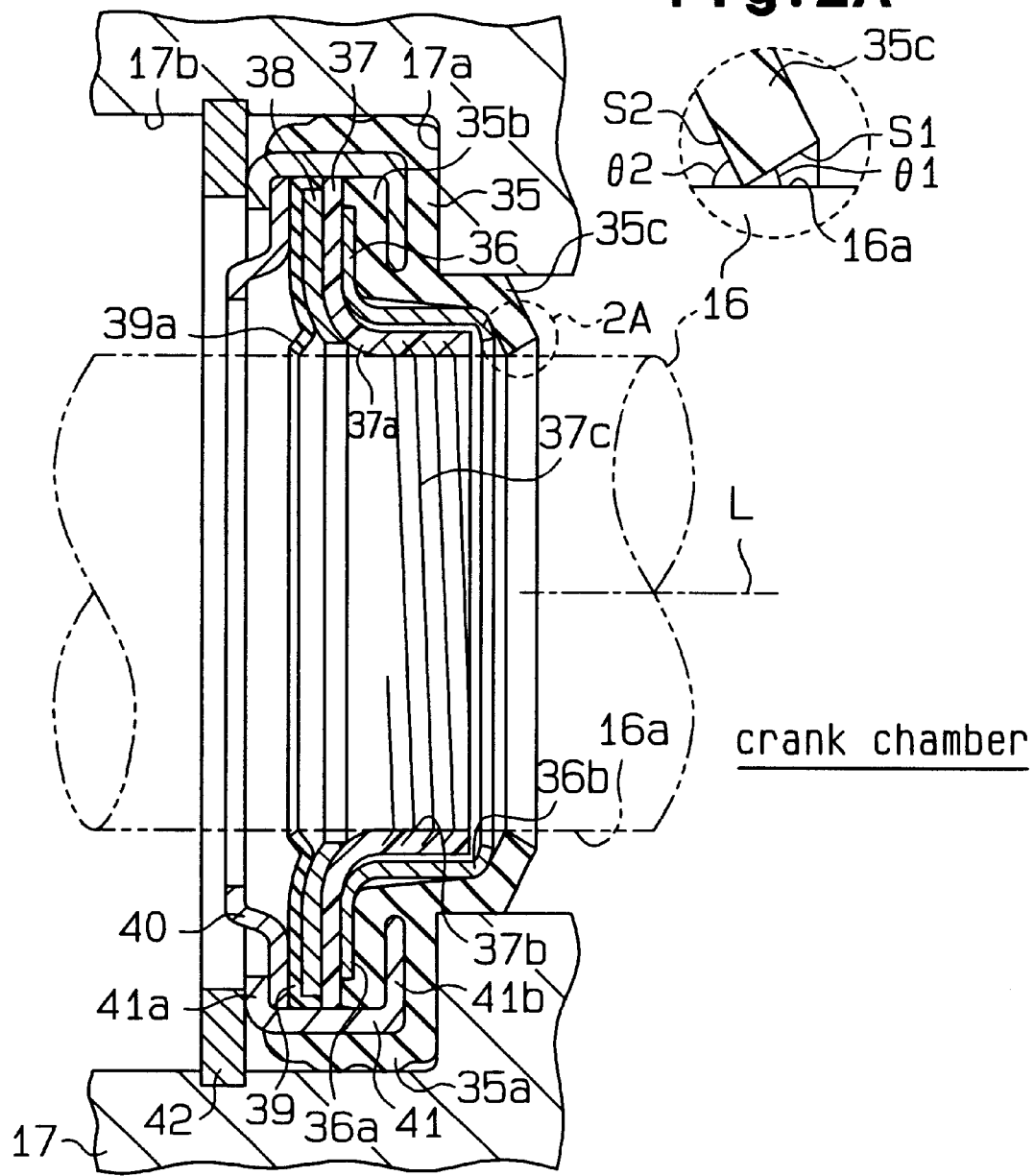

1

SHAFT SEALING ASSEMBLY AND COMPRESSOR INCORPORATING THE SAME

BACKGROUND OF THE INVENTION

The present invention relates to a shaft sealing assembly. More specifically, the present invention pertains to a shaft sealing assembly that prevents fluid such as refrigerant and lubricant from leaking from a compressor.

A typical shaft sealing assembly 50 is structured as follows. As shown in FIGS. 4 and 4A, the sealing assembly 50 is located between a drive shaft 61 and a compressor housing to prevent leakage of fluid from the inside to the outside of the compressor. A first lip ring 51, which is made of synthetic rubber, includes a lip 51a. The lip 51a is formed at the radially inner area of the first lip ring 51. A retainer ring 52, which is made of metal, retains the position of the lip 51a to contact a drive shaft 61. A second lip ring 53, which is made of fluororesin, includes a lip 53a. The lip 53a is formed at the radially inner area of the second lip ring 53 and is curved toward the inside of the compressor (right side in FIG. 4). A spiral pump slit 53b is formed in the lip 53a about the axis of the second lip ring 53. A third lip ring 54, which is made of synthetic rubber, includes a lip 54a. The first lip ring 51, the retainer ring 52, the second lip ring 53, and the third lip ring 54 are arranged in this order from the inside to the outside of the compressor as shown in FIG. 4.

The rings 51–54 are tightly held together in a cylindrical case 55. Accordingly, the first and the second lip rings 52, 53 contact the retainer ring 52 and the case 55.

When the drive shaft 61 is rotating, or when the compressor is operating, high pressure gas in the compressor is applied to the lip 53a of the second lip ring 53. Accordingly, the lip 53a is pressed against the drive shaft 61 by a predetermined force, which prevents leakage of fluid from the compressor. In this state, the pump slit 53b of the lip 53a has a spiral pumping effect and positively sends fluid back between the lip 53a and the drive shaft 16. This also improves the fluid-sealing performance of the second lip ring 53.

When the drive shaft 61 is not rotating, or when the compressor is not operating, the lip 51a of the first lip ring 51 resiliently contacts the drive shaft 61. This prevents leakage of fluid from the compressor. When the drive shaft 61 is not rotating, the pressure in the compressor is relatively low and the lip 53a of the second lip ring 53 is pressed against the rotational shaft 61 by a relatively small force. Accordingly, the shaft sealing assembly includes the first lip ring 51 to compensate for the weak sealing ability of the second lip ring 51.

When the drive shaft 61 is rotating, the lip 51a of the first lip ring 51 allows fluid in the compressor to flow toward the second lip ring 53. The position of the lip 51a with respect to the drive shaft 61 is retained by the retainer ring 52 when high pressure is applied to the inside of the first lip ring 51.

The fluid (mainly lubricant) that leaks by the lip 51a of the first lip ring 51 lubricates and cools the lips 51a, 53a of the first and second lip rings 51, 53. Accordingly, the lips 51a, 53a are not worn by friction. This extends the life of the first and second lip rings 51, 53.

The lip 54a of the third lip ring 54 resiliently contacts the drive shaft 61 and prevents foreign particles from entering. Accordingly, foreign particles do not enter between the lip 53a and the drive shaft 61, which prevents the performance of the second lip ring 53 from deteriorating. When the rotation of the drive shaft 61 is stopped, the third lip ring 54 prevents leakage of fluid that remains between the first lip ring 51 and the second lip ring 53.

However, the first lip ring 51 permits leakage of fluid (refrigerant gas) during the rotation of the drive shaft 61. The seal formed between the second lip ring 53 and the retainer ring 52 and between the second lip ring 53 and the case 55 has a lower sealing performance compared to the contact area seal formed between the first lip ring 51 and the retainer ring 52 and between the first lip ring 51 and the case 55. Accordingly, as shown by FIG. 4A, the refrigerant gas that leaks past the first lip ring 51 is likely to enter between the second lip ring 53 and the retainer ring and between the second lip ring 53 and the case 55.

When the rotation of the drive shaft 61 is stopped, the third lip ring 54 prevents leakage of the fluid remaining between the first lip ring 51 and the second lip ring 53. In other words, the fluid (especially refrigerant gas) between the second lip ring 53 and the retainer ring 52 and between the second lip ring 53 and the case 55 does not flow out of the compressor after the drive shaft 61 is stopped. When the drive shaft 61 is stopped for a relatively long period, the refrigerant gas between the second lip ring 53 and the retainer ring 52 and between the second lip ring 53 and the case 55 can be liquefied by cooler temperatures.

If the drive shaft 61 rotates in this state, the temperature around the shaft sealing assembly 50 increases. Then, the liquidized refrigerant between the second lip ring 53 and the case 55 vaporizes, which moves the second lip ring 53 radially inward. This may release the second lip ring 53 from the case 55. Since the second lip ring 53 and the retainer ring 52 are held together in the case 55 by friction and compression, the release of the second lip ring 53 also releases the retainer ring 52 from the case 55. Accordingly, the retainer ring 52 cannot retain the initial position of the lip 51a of the first lip ring 51 with respect to the drive shaft 61. As a result, the first lip ring 51 may not leak fluid, which causes the first and the second lip rings 51, 53 to wear prematurely.

On the other hand, the released second lip ring 53 may lift the first lip ring 51, through the retainer ring 52, from the drive shaft 61. Thus, when the drive shaft 61 rotates, the first lip ring 51 may leak too much fluid that for the second lip ring 53 and the third lip ring 54 to stop.

SUMMARY OF THE INVENTION

An objective of the present invention is to provide a shaft sealing assembly for compressors that prevents fluid from entering between the periphery of the second lip ring and the case.

To achieve the above objective, the present invention provides a shaft sealing assembly for a rotary shaft extending through and supported by a housing. The shaft sealing assembly includes a first lip ring placed around the shaft. The first ring has a first peripheral portion, which extends in a substantially radial direction with respect to the shaft. The first lip ring also has a first lip portion that contacts the surface of the shaft. The first lip portion resiliently contacts the surface of the shaft. The first lip ring has a predetermined shape that prevents leakage of fluids from the inside of the housing when the shaft is stopped and allows leakage of fluids from the inside of the housing when the shaft rotates. A retainer ring is placed adjacent to the first lip ring around the shaft. The retainer ring has a second peripheral portion that extends in a substantially radial direction with respect to the shaft. The retainer ring supports the first lip ring so that the first ring substantially retains its shape. A second lip ring is also placed around the shaft and adjacent to the retainer ring on the opposite side of the retainer ring from the first lip ring. The second lip ring has a third peripheral portion that extends in a substantially radial direction with respect to the shaft and a second lip portion that extends substantially along the surface of the shaft. The second lip portion resiliently contacts the surface of the shaft to substantially prevent leakage of fluids from the inside of the housing. Further, a case is included for holding the rings together by gripping the first, the second, and the third peripheral portions. The first and the third flange portions extend outwardly beyond the second flange portion to provide an annular contact area, and the first and the second lip rings resiliently contact one another in the contact area.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 2 is an enlarged cross sectional view showing the shaft sealing assembly of FIG. 1;

FIG. 2A is an enlargement of an encircled portion of FIG. 2;

FIG. 3(*b*) is a view showing a projection when no force is applied;

FIG. 3(*c*) is a view showing the projection when a force is applied.

DETAILED DESCRIPTION OF THE INVENTION

A variable displacement compressor for a vehicle air-conditioning system according to one embodiment of the present invention will now be described.

Figure 1:
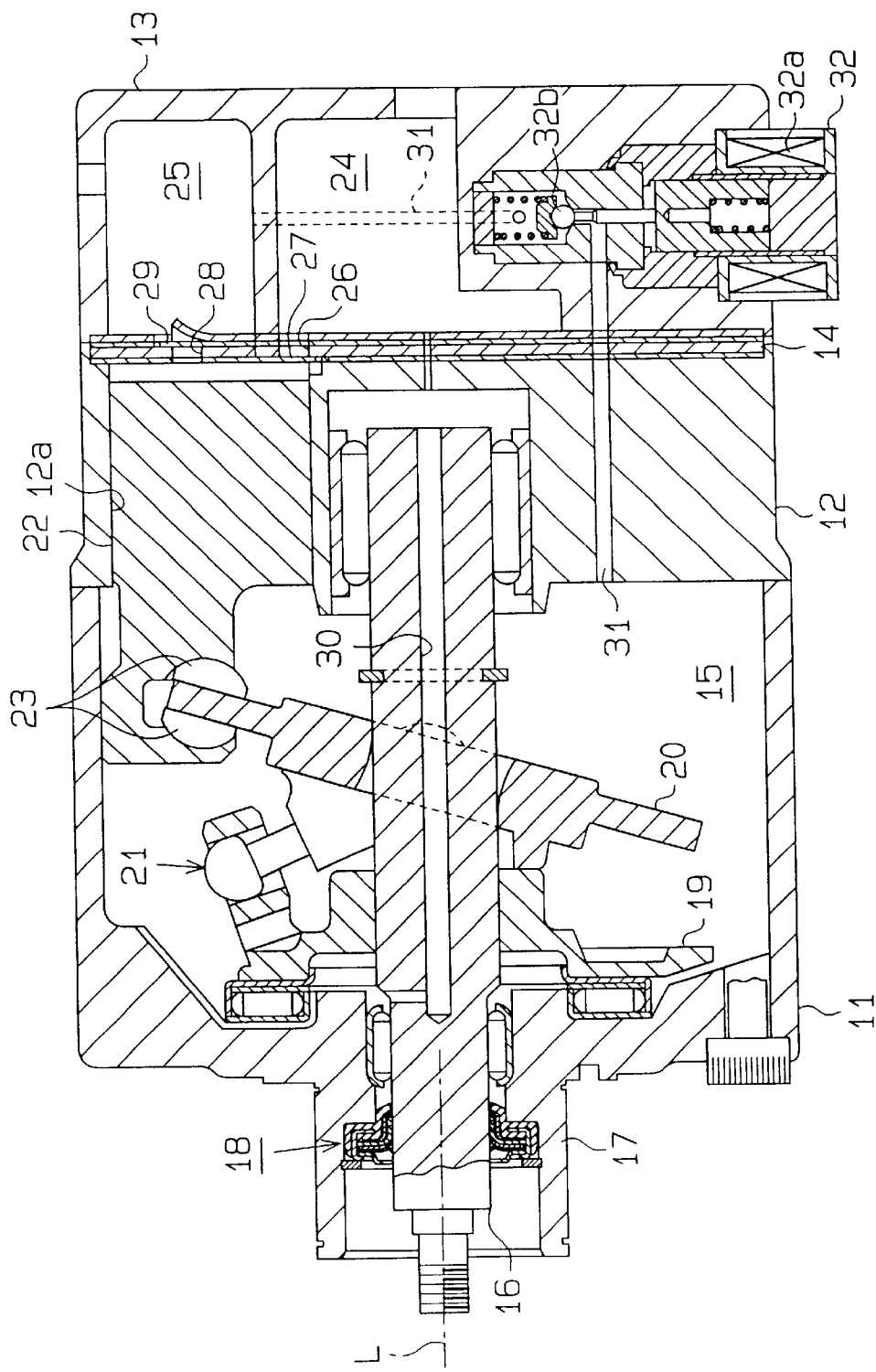
FIG. 1 is a cross sectional view of a variable displacement compressor according to one embodiment of the present invention.

As shown in FIG. 1, a front housing member 11 is coupled to the front end of the cylinder block 12. A rear housing member 13 is coupled to the rear end of the cylinder block 12 through a valve plate 14. A crank chamber 15 is defined between the front housing member 11 and the cylinder block 12.

A drive shaft 16 passes through the crank chamber 15 and is rotatably supported by the front housing member 11 and the cylinder block 12. The front end of the drive shaft 16 extends through the front wall of the front housing member 11. The drive shaft 16 is connected to a vehicle engine (not shown) through a clutch mechanism such as an electromagnetic clutch. Accordingly, when the engine is operating and the clutch mechanism is engaged, the drive shaft 16 rotates.

A boss 17 extends from the front wall of the front housing 11 and surrounds the front end of the drive shaft 16. A shaft sealing assembly 18 is accommodated in the boss 17 and seals the drive shaft 16. The details of the shaft sealing assembly 18 will be described later.

A rotor 19 is secured to the drive shaft 16 in the crank chamber 15. A swash plate 20 is supported by the drive shaft 16 to slide on the surface of the drive shaft 16 and to incline with respect to the drive shaft 16. A hinge mechanism 21 is located between the rotor 19 and the swash plate 20. The hinge mechanism 21 enables the swash plate 20 to rotate integrally with the drive shaft 16 and to slide axially on the surface of the drive shaft 16. When the center of the swash plate 20 moves toward the cylinder block 12, the inclination of the swash plate 20 decreases. When the center of the swash plate 20 moves toward the rotor 19, the inclination of the swash plate 20 increases.

Cylinder bores 12*a* are formed in the cylinder block 12 around the axis of the drive shaft 16. Each cylinder bore accommodates a single head piston 22. Each piston 22 is coupled to the periphery of the swash plate 21 through shoes 23. The rotation of the swash plate 20 is converted to reciprocation of each piston 22 in the corresponding cylinder bore 12*a*.

A suction chamber 24 and a discharge chamber 25 are respectively defined in the rear housing member 13. The valve plate 14 includes suction ports 26, suction valves 27, discharge ports 28, and discharge valves 29. When each piston 22 moves from the top dead center to the bottom dead center position, refrigerant gas in the suction chamber 24 is drawn into the corresponding cylinder bore 12*a* through the corresponding suction port 26 and the corresponding suction valve 27. When each piston 22 moves from the bottom dead center to the top dead center, the refrigerant gas in the corresponding cylinder bore 12*a* is compressed to a predetermined pressure and is discharged to the discharge chamber 25 through the corresponding discharge port 28 and the corresponding discharge valve 29.

A bleed passage 30 connects the crank chamber 15 to the suction chamber 24. A pressurizing passage 31 connects the discharge chamber 25 to the crank chamber 15. An electromagnetic displacement control valve 32 is located in the pressurizing passage 31. The control valve 32 includes a solenoid 32*a* and a valve body 32*b*. The excitation and de-excitation of the solenoid 32*a* caused the valve body 32*b* to open and close the pressurizing passage 31. The excitation and de-excitation of the solenoid 32*a* is controlled by a computer (not shown) in accordance with the cooling load. Accordingly, the opening size of the pressurizing passage 31 is adjusted by the valve body 32*b*, which varies the pressure in the crank chamber 15. This adjusts the difference between the pressure in the crank chamber 15 and the pressure in the cylinder bores 12*a*. As a result, the inclination of the swash plate 20 is varied, thus varying the stroke of each piston 22 and the displacement.

In other words, the de-excitation of the solenoid 32*a* causes the valve body 32*b* to open the pressurizing passage 31, which connects the discharge chamber 25 to the crank chamber 15. Accordingly, high pressure refrigerant gas in the discharge chamber 25 is supplied to the crank chamber 15 through the pressurizing passage 31, which increases the pressure in the crank chamber 15. The increase of pressure in the crank chamber 15 minimizes the inclination of the swash plate 20 and the stroke and displacement of each piston 22. When the solenoid 32*a* is excited, the valve body 32*b* closes the pressurizing passage 31, which lowers the pressure in the crank chamber as the bleed passage 30 releases the pressure. The decrease of the pressure in the crank chamber 15 maximizes the inclination of the swash plate 20 and the stroke and displacement of each piston 22.

The shaft sealing mechanism 18 will now be described.

As shown in FIG. 2, a first lip ring 35, a metal retainer ring 36, a second lip ring 37, a metal shape-retaining ring 38, a third lip ring 39, and a metal end ring 40 are arranged in this order. The first lip ring 35 and the third lip ring 39 are made of synthetic rubber such as an acrylonitrilebutadiene rubber. The second lip ring 37 is made of fluororesin such as PTFE (polytetrafluoroethylene).

A cylindrical metal case 41 includes a front rim 41a and a rear rim 41b. The peripheries of the rings 35–40 are tightly held together by friction and compression between the front rim 41a and the rear rim 41b of the case 41 as shown in FIG. 2. The case 41 and the rings 35–40 are accommodated in the boss 17. Axial movement of the case 41 is limited by a step 17a and a snap ring 42.

The first lip ring 35 is formed by a molding that covers the inner and outer surfaces of the case 41 in the vicinity of the rear rim 41b. A peripheral part of the first lip ring 35 that covers the circumferential surface of the case 41 forms an outer seal 35a, which contacts the inner surface 17b of the boss 17. The outer seal 35a includes projections to improve its sealing function. An inner part of the first lip ring 35 that contacts the inner surface of the case 41 forms an inner seal 35b, or a first peripheral portion, which is tightly held between the retainer ring 36 and the rear rim 41b of the case 41.

A lip 35c is formed at the radially inner part of the first lip ring 35. The lip 35c extends rearward and radially inward. A distal corner of the lip 35c contacts the surface 16a of the drive shaft 16. As shown by FIG. 2A, a conical end surface S1 forms a predetermined angle $\theta 1$ with respect to the surface 16a of the drive shaft 16 (or the axis of the drive shaft 16). A side surface S2 of the lip 35c forms a predetermined angle $\theta 2$ with respect to the surface 16a of the drive shaft 16. The position of the lip 35c of the first lip ring 35 is determined to fulfill the condition of $\theta 1 < \theta 2$. According to experiments by the present inventors, the first lip ring 35 effectively sealed the drive shaft 16 when positioned under the condition of $\theta 1 < \theta 2$ while the drive shaft 16 was not rotating. However, it was also determined that, under these conditions, fluid leakage was permitted while the drive shaft 16 was rotating.

The second lip ring 37 is shaped like a disc with a hole in its center before installation. The second lip ring 37 is made of a sheet of fluororesin. The inner area of the second lip ring 37 is deformed to curve rearward when installed on the drive shaft 16. The central deformed area of the second lip ring 37 forms a lip 37a. A seal surface 37b of the lip 37a, which has a predetermined axial dimension, contacts the surface 16a of the drive shaft 16. A spiral pump slit 37c is formed on the seal surface 37b of the lip 37a about the axis L. When the drive shaft 16 is rotating, the pump slit 37c serves as a pump.

The retainer ring 36 is formed by deforming the inner area of an annular disc 36a, or a second peripheral portion. The deformed portion forms a retaining part 36b. The retaining part 36b extends rearward and is located between the lip 35c of the first lip ring 35 and the lip 37a of the second lip ring 37. The distal end of the retaining part 36b contacts an inner surface of the lip 35c of the first lip ring 35 and supports the lip 35c with respect to the surface 16a of the drive shaft 16 (to maintain the relationship $\theta 1 < \theta 2$).

The third lip ring 39 is formed by molding to cover the front side and the radially outer end surface of a shape-retaining ring 38. The outer diameter of the shape-retaining ring 38 is smaller than the inner diameter of the case 41. The outer diameter of the second and third lip rings 37, 39 are substantially the same as that of the case 41. Accordingly, though the shape-retaining ring 38 is located between the third lip ring 39 and the second lip ring 37, the peripheral part of the third lip ring 39 contacts the second lip ring 37. The lip 39a of the third lip ring 39 contacts the surface 16a of the drive shaft 16.

Figure 3A:
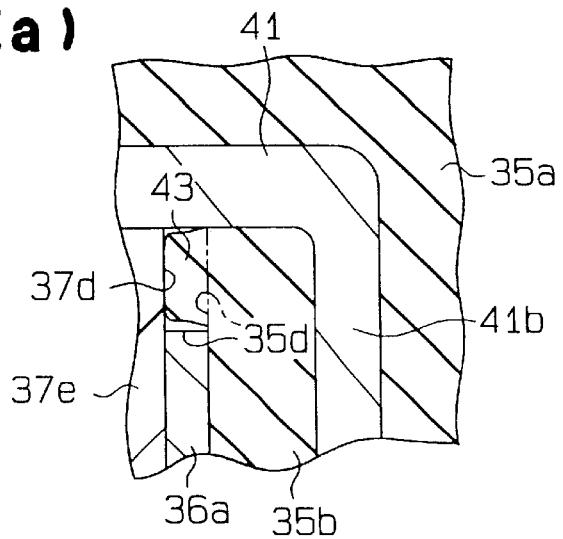
FIG. 3(*a*) is a partial enlarged view of FIG. 2.

As shown in FIG. 3(a), the first and the second lip rings 35, 37 are pressed against each other about the outer rim of the retainer ring 36 in the case 41. That is, contact between the inner seal 35b of the first lip ring 35 and an outer portion 37e, or a third peripheral portion, of the second lip ring 37 occurs radially outward from the annular disc 36a of the retainer ring 36. The outer diameter of the retainer ring 36 is smaller than the inner diameter of the case 41. The outer diameter of the inner seal 35b and the outer diameter of the second lip ring 37 are substantially the same as the inner diameter of the case 41. Accordingly, the inner seal 35b and the second lip ring 37 contact one another (at surfaces 35d, 37d) about the annular disk 36a of the retainer ring 36 in the case 41.

Figure 3B:
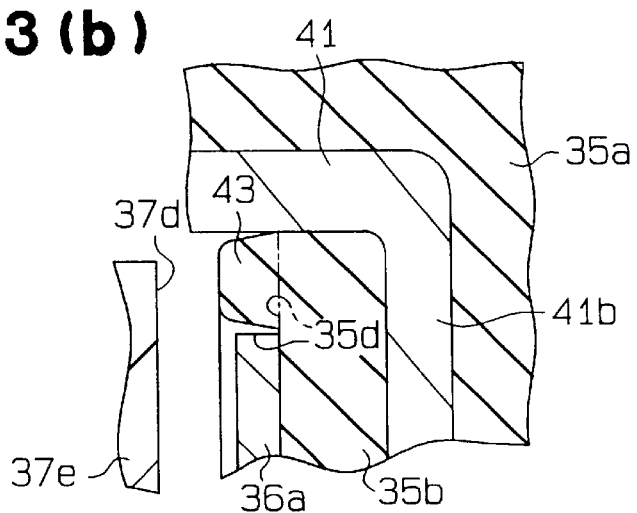
Figure 3C:
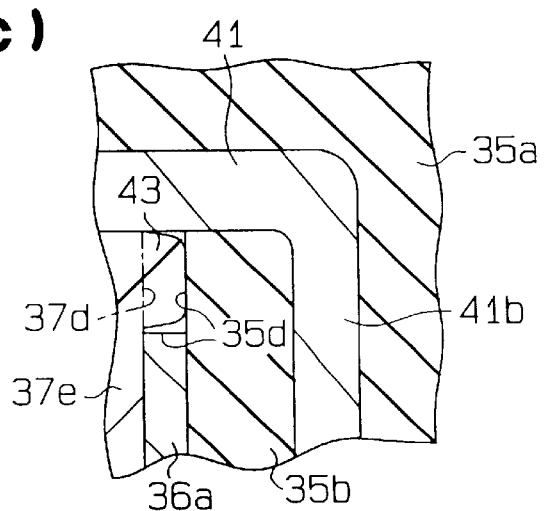

A projection 43 is integrally formed on the facing surface 35d of the inner seal 35b of the first lip ring 35. The projection 43 extends in the direction of the axis L. As shown in FIG. 3(b), when not compressed, the length of the projection 43 in the axial direction from the surface 35d is greater than the thickness of the annular disc 36a of the retainer ring 36, or the distance between the facing surfaces 35d and 37d after assembly. Accordingly, as shown in FIG. 3(a), the projection 43, which is made of synthetic rubber more resilient than fluororesin, is pressed against the facing surface 37d of the second lip ring 37 and is compressed to the thickness of the annular disc 36a of the retainer ring 36 when the rings 35–40 are held together in the case 41. In other words, pressurized contact between the first lip ring 35 and the second lip ring 37 is mainly achieved by the compression of the projection 43 when the rings 35–40 are held in the case 41.

Operation of the shaft sealing assembly will now be described.

When the compressor is operating, high pressure from the crank chamber 15 is applied to the lip 37a of the second lip ring 37. Accordingly, the seal surface 37b of the lip 37a is pressed against the surface 16a of the drive shaft 16, which prevents leakage of fluid (refrigerant gas and lubricant oil) from the crank chamber 15. In this state, the spiral pump slit 37c performs pumping with the relatively rotating surface 16a of the drive shaft 16 and positively sends fluid back between the lip 37a and the drive shaft 16. This improves the fluid-sealing performance of the second lip ring 37.

When the compressor is not operating, the resilient contact of the lip 35c of the first lip ring 35 with the surface 16a of the drive shaft 16 prevents leakage of fluid from the crank chamber 15.

When the compressor is operating, the lip 35c of the first lip ring 35 permits fluid from the crank chamber 15 to flow towards the second lip ring 37. The lip 35c is supported by the retaining portion 36b of the retainer ring 36 and the position of the lip 35c with respect to the shaft 16 is maintained when high pressure from the crank chamber 15 is applied to the first lip ring 35.

When the drive shaft 16 is rotating, the fluid (mainly lubricant oil) leaked by the lip 35c of the first lip ring 35 lubricates and cools the lips 35c, 37a of the first and second lip rings 35, 37. Accordingly, wear of the lips 35c 37a from friction and heat is limited, which extends the life of the first and second lip rings 35, 37.

The lip 39a of the third lip ring 39 resiliently contacts the surface 16a of the drive shaft 16 and prevents foreign particles from entering the shaft sealing assembly 18. Accordingly, the fluid-sealing performance of the second lip ring 37 is not lowered by foreign particles entering between the surface 16a of the drive shaft 16 and the seal surface 37b of the lip 37a. When rotation of the drive shaft 16 is stopped, the third lip ring 39 prevents leakage of fluid remaining between the first lip ring 35 and the second lip ring 37.

As already mentioned, the first lip ring 35 permits leakage of fluid (refrigerant gas) while the drive shaft 16 rotates. The contact between the second lip ring 37 (made of fluororesin) and the retainer ring 36 and the contact between the second lip ring 37 and the case 41 forms a weaker seal than the contact between the first lip ring 35 (made of synthetic rubber) and the retainer ring 36 and the contact between the first lip ring 35 and the case 41.

However, in the illustrated embodiment, the first lip ring 35 is pressed against the second lip ring 37 about the retainer ring 36 in the case 41. In other words, leakage of fluid through contact between the second lip ring 37 and the retainer ring 36 and between the outer end surface of the second lip ring 37 and the case 41 is prevented.

Accordingly, the fluid that leaks past the first lip ring 35 during the rotation of the drive shaft 16 does not enter between the outer edge surface of the second lip ring 37 and the case 41. As a result, the problem in the prior art is solved. That is, the second lip ring 37 is not released from the case 41 when the liquefied refrigerant leaked from the first lip ring 35 evaporates. Therefore, the rings 35–40 continue to be held tightly in the case 41. The predetermined position of the first lip ring 35 with respect to the drive shaft 16 is maintained.

The illustrated embodiment has the following advantages.

The evaporation of liquefied refrigerant leaked from the first lip ring 35 does not occur at the outer edge of the second lip ring 37, which prevents the release of the second lip ring 37 from the case 41. Accordingly, the first lip ring 35 leaks an appropriate amount of fluid during the rotation of the drive shaft.

Figures 4, 4A:
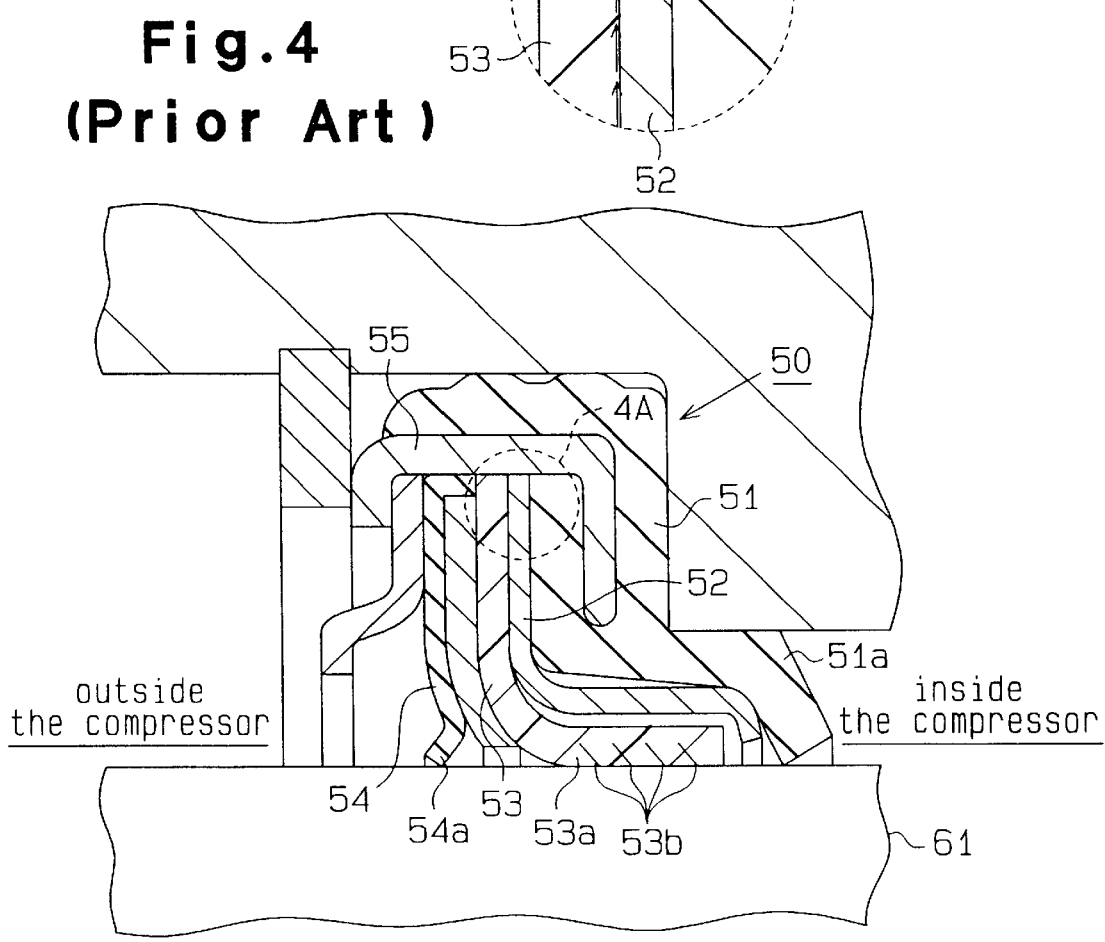
FIG. 4 is a cross sectional view showing a prior art shaft sealing assembly.
FIG. 4A is an enlargement of an encircled portion of FIG. 4.

The projection 43 extends in the direction of the axis L of the drive shaft 16. That is, the first lip ring 35 is pressed against the second lip ring 37 in the direction of the axis L. Accordingly, this achieves pressurized contact between the first lip ring 35 and the second lip ring 37 without adding a special assembly step to the prior art assembly of FIG. 4.

The projection 43 is integrally formed on the first lip ring 35, which facilitates the formation of the projection 43. That is, if the projection 43 were formed on the second lip ring 37, which is made of a sheet of fluororesin, the projection 43 must be formed on the sheet in advance. Also, cutting out the second lip ring 37 from the fluororesin sheet would require accuracy and would complicate the manufacturing process. However, the first lip ring 35 made of the synthetic rubber is molded around the case 41. Accordingly, it is possible to integrally form the projection 43 with the first lip ring 35 by changing the shape of the mold.

The pump slit 37c is formed on the seal surface 37b to improve the sealing performance of the second lip ring 37. The second lip ring 37 leaks very little, if any, of the fluid that leaks past the first lip ring 35 during the rotation of the drive shaft 16. Accordingly, a relatively large amount of fluid exists between the first lip ring 35 and the second lip ring 37 during the rotation of the drive shaft 16. In other words, in the prior art, a relatively large amount of fluid tends to enter between the outer end surface of the second lip ring 37 and the case 41. Therefore, it is important that the first lip ring 35 leaks fluid during the rotation of the drive shaft 16, but not too much fluid.

The shaft sealing assembly 18 includes the third lip ring 39, which is located frontward of the second lip ring 37. Accordingly, when the rotation of the drive shaft 16 is stopped, the third lip ring 39 prevents leakage of the fluid remaining between the first lip ring 35 and the second lip ring 37. In other words, the fluid between the second lip ring 37 and the retainer ring 36 or the case 41 does not drain out of the compressor after the rotation of the drive shaft 16 is stopped. Therefore, it is important that the first lip ring 35 leaks fluid during the rotation of the drive shaft 16, but not too much fluid.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A shaft sealing assembly for a rotary shaft extending through and supported by a housing, wherein the assembly prevents fluid from leaking out of the housing, the sealing assembly comprising:

a first lip ring placed around the shaft, the first ring having a first peripheral portion, which extends in a substantially radial direction with respect to the shaft, and a first lip portion that contacts the surface of the shaft, wherein the first lip portion resiliently contacts the surface of the shaft and has a first and second surface, the first surface being located on an inner side of the first lip portion, and the second surface being located on an outer side of the first lip portion, and wherein the first surface forms a smaller angle than the second surface with respect to the shaft to prevent leakage of fluids from the inside of the housing when the shaft is stopped and allows leakage of fluids from the inside of the housing when the shaft rotates;

a retainer ring placed adjacent to the first lip ring around the shaft, the retainer ring having a second peripheral portion that extends in a substantially radial direction with respect to the shaft, wherein the retainer ring supports the first lip ring so that the first ring substantially retains its shape;

a second lip ring placed around the shaft and adjacent to the retainer ring on the opposite side of the retainer ring from the first lip ring, the second lip ring having a third peripheral portion that extends in a substantially radial direction with respect to the shaft and a second lip portion that extends substantially along the surface of the shaft, wherein the second lip portion resiliently contacts the surface of the shaft to substantially prevent leakage of fluids from the inside of the housing; and a case for holding the rings together by gripping the first, the second, and the third peripheral portions;

wherein the first and third peripheral portions extend outwardly beyond the second peripheral portion to provide an annular contact area, the first and second lip rings resiliently contact one another in the contact area, and wherein at least one of the first and the second lip rings has an angular projection formed in the annular contact area, wherein total projection thickness as measured in the axial direction prior to assembly is greater than that of the second peripheral portion.

2. The shaft sealing assembly of claim 1, wherein the projection is formed integrally with the first lip ring.

3. The shaft sealing assembly according to claim 1, wherein the projection is formed integrally with the second lip ring.

4. The shaft sealing assembly according to claim 2, wherein the first lip ring is made of rubber.

5. The shaft sealing assembly according to claim 4, wherein the second ring is made of fluororesin.

6. The shaft sealing assembly according to claim 1, wherein a pump is provided between the second lip portion and the surface of the shaft such that fluid between the second lip portion and the shaft is pumped toward an inner side of the second lip ring.

7. The shaft sealing assembly according to claim 6, wherein the second lip portion includes an inner surface that contacts the surface of the shaft, and the pump includes a spiral slit formed on the inner surface of the second lip portion.

8. A compressor having a shaft sealing assembly for preventing leakage of fluids from the inside of a housing along a surface of a drive shaft, the shaft extending from the outside to the inside of the housing, wherein the compressor compresses refrigerant gas when the shaft rotates, the compressor comprising:
  a first lip ring placed around the shaft, the first ring having a first peripheral portion, which extends in a substantially radial direction with respect to the shaft, and a first lip portion that contacts the surface of the shaft, wherein the first lip portion resiliently contacts the surface of the shaft and has a first and second surface, the first surface being located on an inner side of the first lip portion, and the second surface being located on an outer side of the first lip portion, and wherein the first surface forms a smaller angle than the second surface with respect to the shaft to prevent leakage of fluids from the inside of the housing when the shaft is stopped and allows leakage of fluids from the inside of the housing when the shaft rotates;
  a retainer ring placed adjacent to the first lip ring around the shaft, the retainer ring having a second peripheral portion that extends in a substantially radial direction with respect to the shaft, wherein the retainer ring supports the first lip ring so that the first ring substantially retains its shape;
  a second lip ring placed around the shaft and adjacent to the retainer ring on the opposite side of the retainer ring from the first lip ring, the second lip ring having a third peripheral portion that extends in a substantially radial direction with respect to the shaft and a second lip portion that extends substantially along the surface of the shaft, wherein the second lip portion resiliently contacts the surface of the shaft to substantially prevent leakage of fluids from the inside of the housing; and
  a case for holding the rings together by gripping the first, the second, and the third peripheral portions;
  wherein the first and third peripheral portions extend outwardly beyond the second peripheral portion to provide an annular contact area, wherein the first and second lip rings resiliently contact one another in the contact area, and wherein at least one of the first and the second lip rings has an angular projection formed in the annular contact area, and wherein total projection thickness as measured in the axial direction prior to assembly is greater than that of the second peripheral portion.

9. The compressor according to claim 8, wherein the projection is formed integrally with the first lip ring.

10. The compressor according to claim 8, wherein the projection is formed integrally with the second lip ring.

11. The compressor according to claim 9, wherein the first lip ring is made of rubber.

12. The compressor according to claim 11, wherein the second ring is made of fluororesin.

13. The compressor according to claim 8, wherein a pump is provided between the second lip portion and the surface of the shaft such that fluid between the second lip portion and the shaft is pumped toward an inner side of the second lip ring.

14. The compressor according to claim 13, wherein the second lip portion includes an inner surface that contacts the surface of the shaft, and the pump includes a spiral slit formed on the inner surface of the second lip portion.

15. A shaft sealing assembly for a rotary shaft extending through and supported by a housing, wherein the assembly prevents fluid from leaking out of the housing, the sealing assembly comprising:
  a first lip ring placed around the shaft, the first ring having a first peripheral portion, which extends in a substantially radial direction with respect to the shaft, and a first lip portion that contacts the surface of the shaft, wherein the first lip portion resiliently contacts the surface of the shaft and has a first and second surface, the first surface being located on an inner side of the first lip portion, and the second surface being located on an outer side of the first lip portion, and wherein the first surface forms a smaller angle than the second surface with respect to the shaft to prevent leakage of fluids from the inside of the housing when the shaft is stopped and allows leakage of fluids from the inside of the housing when the shaft rotates;
  a retainer ring placed adjacent to the first lip ring around the shaft the retainer ring having a second peripheral portion that extends in a substantially radial direction with respect to the shaft, wherein the retainer ring supports the first lip ring so that the first ring substantially retains its shape;
  a second lip ring placed around the shaft and adjacent to the retainer ring on the opposite side of the retainer ring from the first lip ring, the second lip ring having a third peripheral portion that extends in a substantially radial direction with respect to the shaft and a second lip portion that extends substantially along the surface of the shaft, wherein the second lip portion resiliently contacts the surface of the shaft to substantially prevent leakage of fluids from the inside of the housing; and
  a case for holding the rings together by gripping the first, the second, and the third peripheral portions;
  wherein the assembly includes a seal means for preventing fluid from reaching a peripheral edge of the second lip ring;
  wherein the first and the third peripheral portions extend outwardly beyond the second peripheral portion to provide an annular contact area, wherein the first and the second lip rings resiliently contact one another in the contact area, wherein at least on of the first and the second lip rings has an annular projection formed in the annular contact area, and wherein total projection thickness as measured in the axial direction prior to assembly is greater than that of the second peripheral portion.

* * * * *